Patented May 13, 1947

2,420,490

UNITED STATES PATENT OFFICE 2,420,490

Δ¹⁶-PREGNENEDIOLS AND PROCESS FOR PRODUCING THE SAME

Russell Earl Marker, Mexico City, Mexico, assignor to Parke, Davis & Company, Detroit, Mich., a corporation of Michigan No Drawing. Original application June 30, 1941, Serial No. 400,559. Divided and this application May 24, 1944, Serial No. 537,200

7 Claims. (Cl. 260—397.5)

This invention relates to new hormone intermediates and preparation of the same. More particularly, it relates to the preparation of a new class of hormone intermediates which may be designated as Δ¹⁶-20-hydroxy-pregnene compounds.

This application is a division of my copending application, Serial No. 400,559, filed June 30, 1941, now Patent No. 2,352,648, issued July 4, 1944.

In my copending application, Serial No. 393,-667, filed May 15, 1941, now Patent No. 2,352,852, issued July 4, 1944, it is shown that steroidal sapogenins can be converted into a new class of compounds which I designate as pseudo-sapogenins, including pseudo-sapogenin exo-aceylates.

In my copending application, Serial No. 382,451, filed March 8, 1941 now Patent No. 2,352,850, issued July 4, 1944, it is shown that diosgenin may be converted into pseudo-diosgenin diacetate.

In the copending application of Marker, Crooks and Wittle, Serial No. 393,666, filed May 15, 1941, now Patent No. 2,352,851, issued July 4, 1944, there is described the oxidation of pseudo-sapogenin exoacylates to give a new class of esters designated 20-keto-16-(δ-acyloxy-isocaprooxy)-pregnane compounds represented by the partial formula

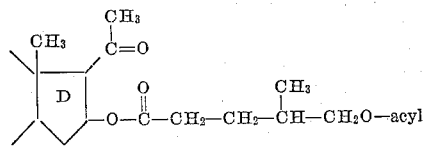

I have discovered that when these new esters are reduced, there are obtained new and useful intermediates for the preparation of hormones.

According to my invention, the 20-keto-16-(δ-acyloxy-isocaprooxy)-pregnane compound is subjected to hydrolytic treatment with an acidic or an alkaline reagent thereby forming a Δ¹⁶-20-keto-pregnene compound and the latter is reduced then with the combination of (a) a primary or secondary alcohol and (b) an aluminum alcoholate or a compound of the formula Z—Mg—OR, where Z is an anion such as chloride, sulfate, or p-toluene-sulfonate, Mg is magnesium, and OR is an alcoholate group such as isopropylate, t-butylate, and the like. Thus there is obtained a Δ¹⁶-20-(β)-hydroxypregnene compound which may be represented by the following partial formula

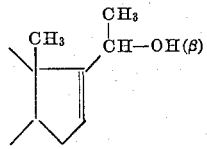

Where the term 20-(β)-hydroxy occurs in this specification, it will be understood that this term refers to one of the two epimers theoretically possible. See further R. E. Marker et al., J. Am. Chem. Soc., 59, 2291 (1937).

Thus my invention relates to a new class of steroids designated as Δ¹⁶-20-(β)-hydroxypregnene compounds. As already indicated, these new compounds may have in rings A and B of the steriod nucleus almost any of the structural features known in steriod chemistry. Thus, rings A and B may be saturated or unsaturated and may be unsubstituted or may bear substituents such as halogen, hydroxyl, carboxyl, amino, ether or like groups or groups hydrolyzable to these.

My invention also comprehends derivatives which are hydrolyzable to yield Δ¹⁶-20-(β)-hydroxypregnene compounds. These derivatives comprise, for example, esters and ethers such as the acetates, benzoates, stearates, benzyl ethers and the like. They are prepared, for example, by the action of acylating or etherifying agents on the parent carbinols.

Generally, the new compounds of my invention are representable by the following formula

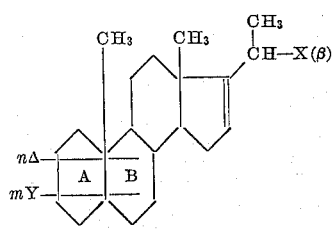

where X is a member of the class consisting of hydroxyl and groups hydrolyzable to hydroxyl; where the symbol nΔ represents n carbon-to-carbon double bonds in the A—B portion of the steroid nucleus, $n$ having one of the values 0, 1, 2 and 3; and where the symbol $mY$ represents $m$ substituents attached to the methylene carbon atoms of the A—B portion of the steriod nucleus, said substituents being selected from the class consisting of

and groups hydrolyzable to

$m$ having one of the values 0, 1, 2 and 3, and $m$ and $n$ being so chosen that their sum, $m+n$, does not exceed the value 3.

My invention may be illustrated by the following examples.

(a) Diosgenin is treated (as set forth more fully in my copending application, Serial No. 382,451, filed March 8, 1941, for six to fifteen hours with acetic anhydride at 200° C., thereby forming pseudo-diosgenin diacetate. After crystallization from methanol, the pseudo-diosgenin diacetate has a melting point of 97–100° C.

(b) Pseudo-diosgenin diacetate is oxidized with chromic anhydride in acetic acid at 28° C. as set forth more fully in the copending application of Russell Earl Marker, Harry Means Crooks, Jr., and Eugene LeRoy Wittle, Serial No. 393,666, filed May 15, 1941. Thus there is obtained the corresponding 20 - keto - 16 - (δ - acyloxy - iso - caprooxy) - pregnane compound of melting point 85–86° C. This compound is believed to have the structure

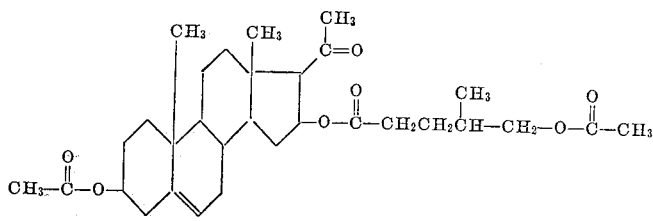

and it may be designated as Δ⁵-pregnenediol-3(β), 16 - one - 20, 3 - acetate - 16 - (δ - acetoxy)-isocaproate.

(c) Three hundred milligrams of the above ester is refluxed in 20 cc. of alcohol with 300 mgs. of potassium hydroxide for thirty minutes. Then water is added and the organic material removed with ether. The ethereal layer is washed with water and then the solvent is removed to leave a residue which may be crystallized from acetone and from ethyl acetate. The product thus obtained is Δ⁵,¹⁶-pregnadienol-3-(β)-one-20 of melting point 213–215° C. It does not depress in melting point when mixed with an authenic sample.

The same Δ⁵,¹⁶-pregnadienol-3-(β)-one-20 may be obtained when the oxidation product above is refluxed with 10% alcoholic hydrochloric acid or with alcoholic potassium carbonate solution. In each case the yield is practically theoretical.

(d) A mixture of 1 g. of Δ⁵,¹⁶-pregnadienol-3-(β)-one-20, 5 g. of aluminum isopropylate and 100 cc. of dry isopropyl alcohol is refluxed for seven hours. Then the mixture is slowly distilled through a short column over a period of five hours. The residue is refluxed with an excess of 2% alcoholic potassium hydroxide solution for 30 minutes. Then the mixture is diluted with water, extracted with ether and the ethereal solution washed well with water. After removal of the ether, the residue is crystallized from ether and from dilute acetone to give Δ⁵,¹⁶-pregnadiendiol-3-(β), 20-(β) of melting point 169–171° C.

On refluxing a sample of this diol with acetic anhydride and then removing the excess acetic anhydride by distillation in vacuo, there is obtained Δ⁵,¹⁶-pregnadiendiol-3-(β), 20-(β)-diacetate. After crystallization from dilute methanol this diacetate has M. P. 121° C.

The structure of this diol is proved by its hydrogenation to the known allo-pregnanediol-3-(β), 20-(β). For this purpose, a mixture of 50 mg. of Δ⁵,¹⁶-pregnadiendiol-3-(β), 20-(β) in 20 cc. of ether and 20 cc. of methanol containing a few drops of acetic acid, shaken with 100 mg. of platinum oxide catalyst under pressure of 45 lbs. of hydrogen for one hour. Then the mixture is filtered and the solvents removed. The residue is crystallized from acetone, thereby yielding allo-pregnanediol-3-(β), 20-(β) of melting point 192–194° C.

Instead of using Δ⁵-pregnenediol-3-(β), 16-one-20 3-acetate 16-(δ-acetoxy)-isocaproate in this example, there may be used other similar esters derived by the oxidation of other esters of pseudo-diosgenin. For example, pseudo-diosgenin dipropionate, pseudo-diosgenin di-n-butyrate, pseudo-diosgenin dibenzoate or, in general, any pseudo-diosgenin diacylate may be oxidized to yield the corresponding ester and this reduced as described.

Again, instead of using in these examples the ester obtained by oxidizing a diacylate of pseudo-diosgenin, there may be used esters obtained by oxidizing the diacylates of other pseudo-sapogenins. For instance, these examples may be practiced according to parts (c) and (d) on allo-pregnanediol-3-(β), 16-one-20 3-acetate 16-(δ-acetoxy)-isocaproate of melting point 102–4° C. as obtained by the oxidation of pseudo-tigogenin diacetate. Thus, hydrolysis of this ester according to part (c) gives Δ¹⁶-allo-pregnenol-3-(β)-one-20 of melting point 204–206° C. Reduction of this compound with aluminum isopropylate and isopropyl alcohol according to the directions of part (d) above yields Δ¹⁶-allo-pregnenediol-3-(β), 20-(β) of melting point 188–190° C. This substance forms a diacetate of melting point 102–4° C.

The above examples are intended to illustrate but not to limit the scope of my invention. Other modes of employing my process apparent to those skilled in the art after this disclosure, are intended to fall within the scope of my invention and accordingly I wish to limit the scope of my invention only as indicated in the appended claims.

What I claim as my invention is:

1. Process for preparing hydroxy-pregnane derivatives which comprises subjecting a steroid having in ring D the structure

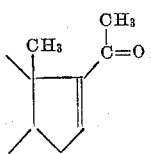

to the action of a member of the class consisting of primary alcohols and secondary alcohols, in combination with a member of the class consisting of aluminum alcoholates and compounds of the formula Z—Mg—OR, where Z is an anion and —OR is an alcoholate grouping, thereby producing a steroid having in ring D the structure

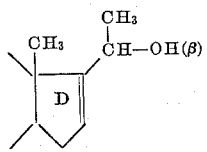

2. A 20-(β)-hydroxy-pregnane compound having one of the formulas

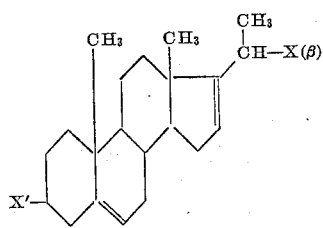

and

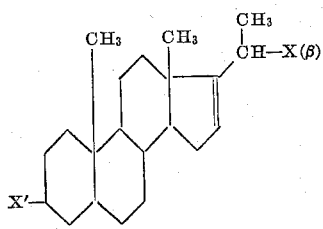

where X and X' are each an acyl group.

3. A compound having the formula

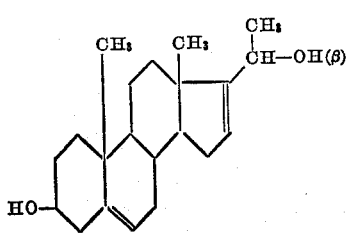

4. A compound having the formula

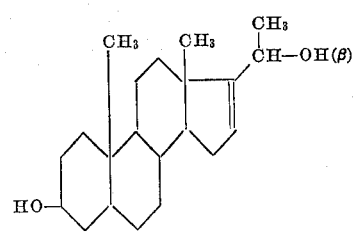

5. Δ$^{5,16}$-pregnadiendiol-3(β), 20(β) diacetate.

6. A 20-(β)-hydroxy-pregnane compound having one of the formulas

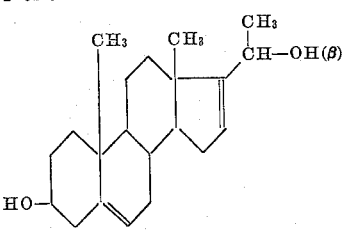

and

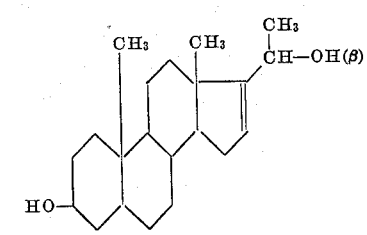

7. Process for preparing hydroxy-pregnane derivatives which comprises subjecting a steroid of the formula

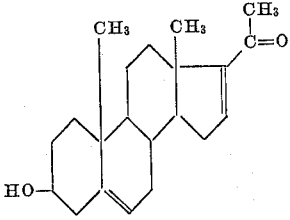

to the action of a member of the class consisting of primary alcohols and secondary alcohols, in combination with a member of the class consisting of aluminum alcoholates and compounds of the formula Z—Mg—OR, where Z is an anion and —OR is an alcoholate grouping, thereby reducing only the 20-keto group and producing a steroid of the formula

RUSSELL EARL MARKER.